United States Patent
Sun et al.

(10) Patent No.: US 11,681,343 B2
(45) Date of Patent: Jun. 20, 2023

(54) TERMINAL DEVICE AND METHOD AND SYSTEM FOR MONITORING BATTERY SAFETY IN TERMINAL DEVICE

(71) Applicant: GUANGDONG OPPO MOBILE TELECOMMUNICATIONS CORP., LTD., Guangdong (CN)

(72) Inventors: Yong Sun, Guangdong (CN); Zhihua Hu, Guangdong (CN); Shangbo Lin, Guangdong (CN); Jialiang Zhang, Guangdong (CN); Hui Zhang, Guangdong (CN); Shebiao Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 618 days.

(21) Appl. No.: 16/713,559

(22) Filed: Dec. 13, 2019

(65) Prior Publication Data
US 2020/0117260 A1    Apr. 16, 2020

Related U.S. Application Data

(63) Continuation of application No. PCT/CN2018/091341, filed on Jun. 14, 2018.

(30) Foreign Application Priority Data

Jul. 21, 2017    (CN) .......................... 201710600530.3

(51) Int. Cl.
*G06F 1/28*    (2006.01)
*G06F 21/81*   (2013.01)
*H04M 1/02*    (2006.01)

(52) U.S. Cl.
CPC ............... *G06F 1/28* (2013.01); *G06F 21/81* (2013.01); *H04M 1/0202* (2013.01)

(58) Field of Classification Search
USPC ......................................... 320/105
See application file for complete search history.

(56) References Cited

U.S. PATENT DOCUMENTS 10,945,900 B1 *  3/2021  Ousborne ............ A61G 5/1005
2009/0309745 A1  12/2009  Johnson
(Continued)

FOREIGN PATENT DOCUMENTS

CN         1870705       11/2006
CN         101039189     9/2007
(Continued)

OTHER PUBLICATIONS

WIPO, ISR for PCT/CN2018/091341, Sep. 25, 2018.
(Continued)

*Primary Examiner* — Mohammed Alam
(74) *Attorney, Agent, or Firm* — Hodgson Russ LLP

(57) ABSTRACT

Provided are a terminal device and a method and system for monitoring battery safety in a terminal device. The method includes the following. Power-off information generated upon disconnection between a battery connector of the terminal device and a main board of the terminal device is acquired. Whether the disconnection between the battery connector and the main board is an unauthorized disconnection is determined according to the power-off information. Upon determining that the disconnection between the battery connector and the main board is the unauthorized disconnection, determine that a battery of the terminal device has safety hazard and control the terminal device to send reminder information indicative of battery abnormality.

19 Claims, 9 Drawing Sheets

(56) References Cited

U.S. PATENT DOCUMENTS

| | | | | |
|---|---|---|---|---|
| 2012/0086400 A1* | 4/2012 | White | | H02J 7/0016 320/128 |
| 2012/0319658 A1* | 12/2012 | White | | H02J 7/0047 320/164 |
| 2013/0177783 A1 | 7/2013 | Marutani et al. | | |
| 2014/0266049 A1* | 9/2014 | Benckenstein, Jr. | | H02J 7/0031 320/112 |
| 2015/0214758 A1 | 7/2015 | Toya et al. | | |
| 2020/0099216 A1* | 3/2020 | Chen | | H01M 10/0525 |
| 2020/0117260 A1* | 4/2020 | Sun | | G06F 1/28 |
| 2022/0083117 A1* | 3/2022 | Lee | | G06F 1/325 |

FOREIGN PATENT DOCUMENTS

| | | |
|---|---|---|
| CN | 101106582 | 1/2008 |
| CN | 101853347 | 10/2010 |
| CN | 103109414 | 5/2013 |
| CN | 103747142 | 4/2014 |
| CN | 103973893 | 8/2014 |
| CN | 104427016 | 3/2015 |
| CN | 105259980 | 1/2016 |
| CN | 106114258 | 11/2016 |
| CN | 106355681 | 1/2017 |
| WO | 2011134225 | 11/2011 |

OTHER PUBLICATIONS

EPO, Communication for EP Application No. 18835045.8, dated Jan. 27, 2021.
EPO, Office Action for EP Application No. 18835045.8, dated Jun. 4, 2020.
SIPO, First Office Action for CN Application No. 201710600530.3, dated Mar. 28, 2019.
SIPO, Second Office Action for CN Application No. 201710600530. 3, dated May 29, 2019.
SIPO, Third Office Action for CN Application No. 201710600530. 3, dated Sep. 4, 2019.
IPIN, First Examination Report issued in corresponding IN application No. 201917051562 dated Jul. 29, 2021.

* cited by examiner

US 11,681,343 B2

TERMINAL DEVICE AND METHOD AND SYSTEM FOR MONITORING BATTERY SAFETY IN TERMINAL DEVICE

CROSS-REFERENCE TO RELATED APPLICATIONS

This application is a continuation of International Application No. PCT/CN2018/091341, filed on Jun. 14, 2018, which claims priority to Chinese Patent Application No. 201710600530.3, filed on Jul. 21, 2017, the entire disclosures of which are incorporated herein by reference.

TECHNICAL FIELD

This disclosure relates to the technical field of terminal devices, and more particularly to a method for monitoring battery safety in a terminal device, a computer readable storage medium, a system for monitoring battery safety in a terminal device, and a terminal device.

BACKGROUND

When terminal devices such as mobile phones are in use, the mobile phone may experience crash and then be disassembled privately by a user or an unauthorized entity. However, when the mobile phone is disassembled privately after crash, since the manner in which the mobile phone is disassembled and assembled is not standard, it is possible to lead to battery damage to some extent, which will result in some safety hazard if the mobile phone continues to be used as usual.

SUMMARY

According to a first aspect of the present disclosure, a method for monitoring battery safety in a terminal device is provided. The method includes the following. Power-off information generated upon disconnection between a battery connector of the terminal device and a main board of the terminal device is acquired. Whether the disconnection between the battery connector and the main board is an unauthorized disconnection is determined according to the power-off information. Determine that a battery of the terminal device has safety hazard, upon determining that the disconnection between the battery connector and the main board is the unauthorized disconnection.

According to a second aspect of the present disclosure, a system for monitoring battery safety in a terminal device is provided. The system includes: a main board comprising a CPU; a battery connector, configured to be connected with the main board; a detecting circuit, configured to detect a status of connection between the main board and the battery connector, where the CPU is configured to generate power-off information when the detecting circuit detects that the connection between the main board and the battery connector is disconnected; a controller, configured to determine whether the battery has safety hazard according to the power-off information.

According to a third aspect of the present disclosure, a terminal device is provides. The terminal device includes a battery connector, a main board, a battery configured to be connected with the main board via the battery connector, a detecting circuit, and a controller. The detecting circuit is configured to detect a status of connection between the main board and the battery connector, where the main board is configured to generate power-off information when the detecting circuit detects that the connection between the main board and the battery connector is disconnected. The controller is configured to determine whether the battery has safety hazard according to the power-off information.

DETAILED DESCRIPTION

Figure 1:
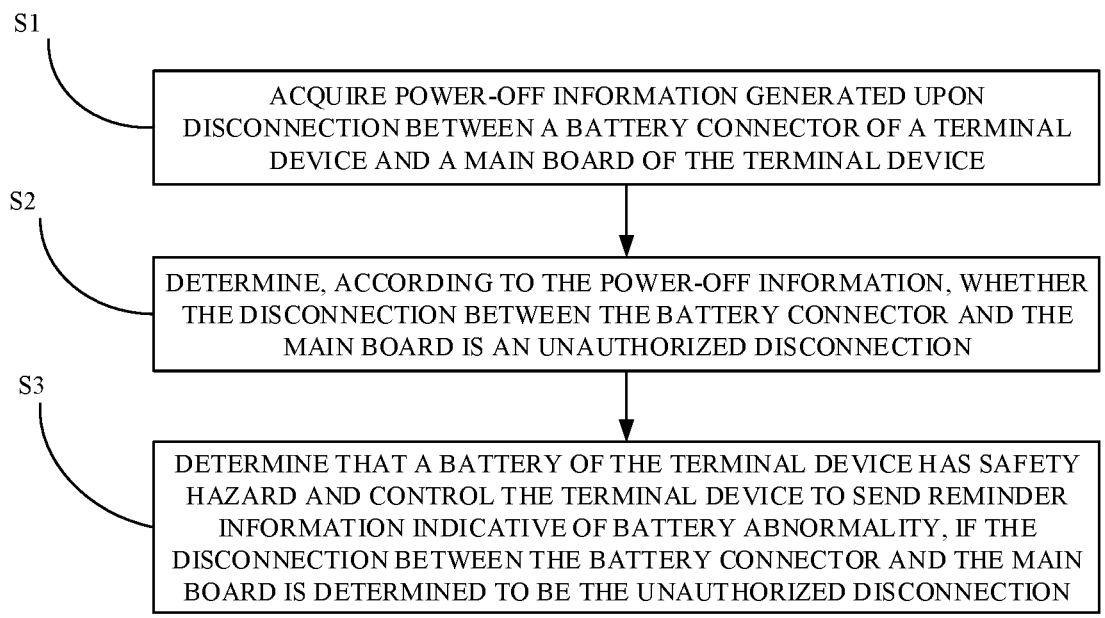
FIG. 1 is a flowchart of a method for monitoring battery safety in a terminal device according to an implementation of the present disclosure.

Implementations of the present disclosure will be further described below and examples of the implementations are illustrated in the accompanying drawings, where the same or similar reference numerals denote the same or similar elements or elements with the same or similar functions throughout the whole context. The implementations described hereinafter with reference to the accompanying drawings are illustrative and for the purpose of explanation rather than restriction of the disclosure.

It should be noted that, in implementations of the present disclosure, the "terminal device" can include but is not limited to a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an AM-FM broadcast transmitter, and/or with another communication terminal. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone receiver such as a conventional laptop or a handheld receiver.

A battery of the terminal device in implementations of the disclosure is a non-removable battery. The battery is a built-in battery of the terminal device and is coupled with a main board of the terminal device via a battery connector.

The main board of the terminal device can include a converting circuit. The converting circuit is configured to convert a voltage outputted by a power adaptor to meet requirements on the expected charging voltage and/or charging current of the battery.

As an example, the converting circuit can be a charging management module, such as a charging chip of the terminal device. When the battery is charged, the converting circuit is configured to manage a charging voltage and/or a charging current of the battery. The converting circuit can include at least one of a voltage feedback function and a current feedback function to achieve management of at least one of the charging voltage and the charging current of the battery respectively.

For example, a charging process of the battery can include at least one of a trickle charging stage, a constant-current charging stage, and a constant-voltage charging stage. In the trickle charging stage, the converting circuit can utilize a current feedback loop to make current flowing into the battery in the trickle charging stage satisfy the expected charging current of the battery (such as a first charging current). In the constant-current charging stage, the converting circuit can utilize the current feedback loop to make current flowing into the battery in the constant-current charging stage satisfy the expected charging current of the battery 133 (such as a second charging current, which may be larger than the first charging current). In the constant-voltage charging stage, the converting circuit can utilize a voltage feedback loop to make voltage applied to the battery in the constant-voltage charging stage satisfy the expected charging voltage of the battery.

As an example, when the voltage outputted by the power adaptor is lower than the expected charging voltage of the battery, the converting circuit can be configured to increase the voltage outputted by the power adaptor to make the increased charging voltage satisfy requirements on the expected charging voltage of the battery.

It should be understood that, a speed at which the battery is charged can be increased by adopting the increased charging voltage for charging, that is, the terminal device of implementations of the disclosure has a quick charging function to charge the battery quickly. Therefore, the terminal device of implementations of the disclosure has high requirements on battery safety performance. In order to meet requirements on battery safety performance of the terminal device, a terminal device and a method and system for monitoring battery safety for the terminal device are provided in the present disclosure.

Hereinafter, the terminal device and the method and system for monitoring battery safety for the terminal device in implementations of the disclosure will be described with reference to the accompanying drawings.

According to an implementation of the disclosure, a method for monitoring battery safety for the terminal device is provided, in which power-off information generated upon disconnection between a battery connector of the terminal device and a main board of the terminal device is acquired, whether the disconnection between the battery connector and the main board is an unauthorized disconnection is determined according to the power-off information, and a battery of the terminal device is determined to have safety hazard if the disconnection between the battery connector and the main board is the unauthorized disconnection.

FIG. 1 is a flowchart of a method for monitoring battery safety in a terminal device according to an implementation of the present disclosure. As illustrated in FIG. 1, the method is performed in a terminal device and includes the following.

At S1, acquire power-off information generated upon disconnection between a battery connector of the terminal device and a main board of the terminal device.

In an implementation, the terminal device such as a mobile terminal includes a detecting circuit for detecting whether the battery connector is disconnected from the main board. The battery connector is a board-to-board (BTB) connector.

In an example, the BTB connector can include a metal pressing board, and the detecting circuit can be coupled with the metal pressing board. In this way, when the metal pressing board is removed or disconnected, the detecting circuit changes from a short-circuit state to an open-circuit state. In the short-circuit state, both ends of the detecting circuit are short connected and no current flows through the detecting circuit. As such, when the detecting circuit switches to the open-circuit state, determine that the metal pressing board has been taken out or disconnected, thereby further determining that the battery connector is disconnected from the main board.

Figure 2:
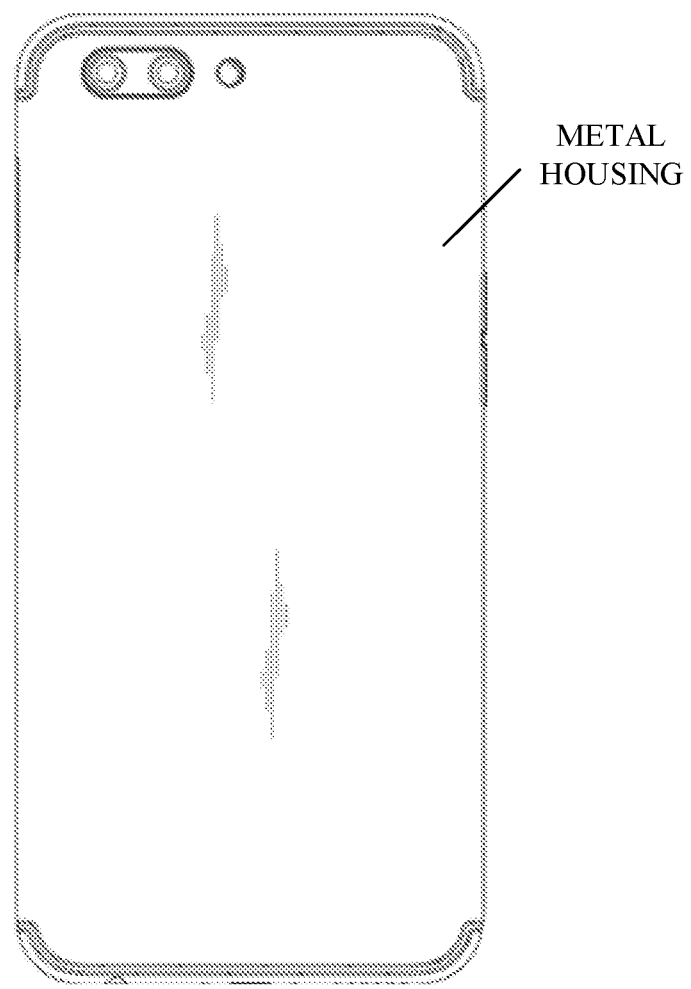
FIG. 2 is a schematic diagram illustrating appearance of a terminal device according to an implementation of the present disclosure.
Figure 3:
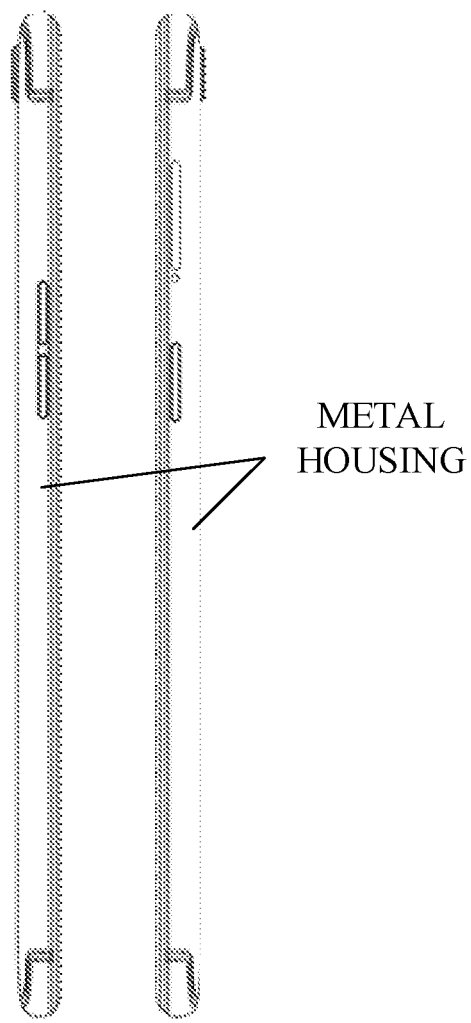
FIG. 3 is a schematic diagram illustrating appearance of a terminal device according to another implementation of the present disclosure.
Figure 4:
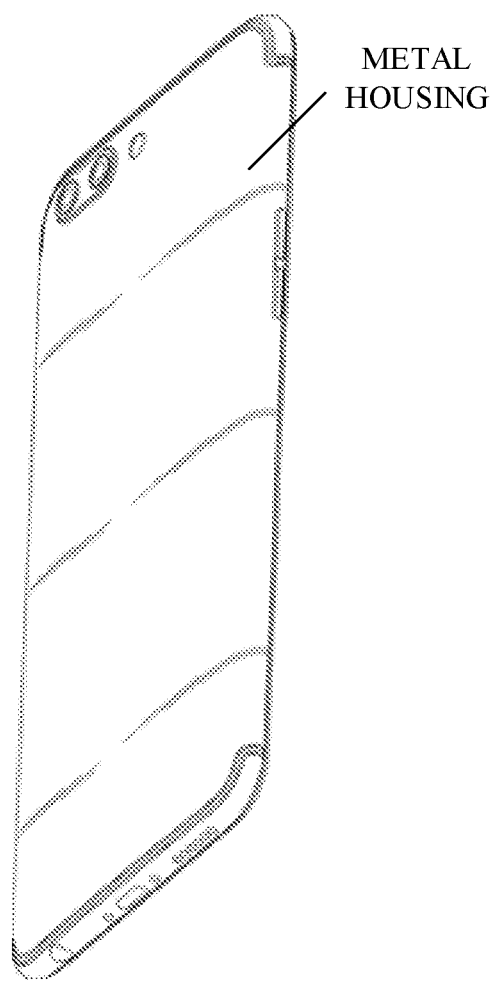
FIG. 4 is a schematic diagram illustrating appearance of a terminal device according to another implementation of the present disclosure.

For example, as illustrated in FIG. 2, FIG. 3, and FIG. 4, the terminal device such as a mobile phone can include a metal housing. The metal housing, which can be used as the metal pressing board of the BTB connector, is connected and fixed with a body of the terminal device through adhesion, welding, etc. In general, since the battery is a built-in battery of the terminal device, the metal housing will not be removed unless the battery is disassembled. Therefore, the detecting circuit is coupled with the metal housing, and can switch between a short-circuit state and an open-circuit state according to the status of the metal housing, for example, the detecting circuit will change from the short-circuit state to the open-circuit state when the metal housing is removed. In this way, it is possible to determine that the metal housing is removed when the detecting circuit changes into the open-circuit state, and further determine that the battery connector is disconnected from the main board.

In another example, the detecting circuit and a management chip or a control chip of the battery can transmit/receive signals to/from each other periodically through the BTB connector. Upon the detecting circuit detects that periodic signal transmission/reception has stopped, the battery connector can be determined to be disconnected from the main board.

In addition, the detecting circuit can also be connected with a central processing unit (CPU) of the main board. When the detecting circuit detects that the battery connector is disconnected from the main board, the CPU can control a status register thereof to generate power-off state bit information and to use the power-off state bit information as the power-off information.

At S2, determine, according to the power-off information, whether the disconnection between the battery connector and the main board is an unauthorized disconnection.

In implementations of the disclosure, the disconnection between the battery connector and the main board may be an after-sales disconnection, for example, an authorized entity disassembles the battery during a professional repair or detection, or may be the unauthorized disconnection (that is, disconnection due to unauthorized disassembly), for example, a user of the terminal device or an unauthorized entity disassembles the battery privately.

When the authorized entity disassembles the battery, such disassembly behavior can be marked as normal through some operations, such as resetting or marking the power-off state bit information.

In an implementation, take resetting the power-off state bit information as an example. In this case, whether the power-off state bit information has been reset is determined. If the power-off state bit information has been reset, the disconnection between the battery connector and the main board can be determined to be the after-sales disconnection. On the other hand, if the power-off state bit information has not been reset, the disconnection between the battery connector and the main board can be determined to be the unauthorized disconnection.

For instance, power-off state bit will be set to 1 when the battery connector is disconnected from the main board. When the authorized entity disassembles the battery, a resetting instruction can be written into programs run in the CPU to restore the power-off state bit set from 1 to 0. Alternatively, the power-off state bit information can be reset through a real-time clock (RTC).

As such, after the battery connector is reconnected with the main board, if the power-off state bit remains 1, the disconnection between the battery connector and the main board can be determined as the unauthorized disconnection. If the power-off state bit is 0, the disconnection between the battery connector and the main board can be determined as the after-sales disconnection.

In another implementation, take marking the power-off state bit information as an example. In this case, whether the power-off state bit information has been marked is determined. If the power-off state bit information has been marked, the disconnection between the battery connector and the main board can be determined to be the after-sales disconnection. If the power-off state bit information has not been marked, the disconnection between the battery connector and the main board can be determined to be the unauthorized disconnection.

For example, the power-off state bit information can be marked through a power-on-again identifier of a power management integrated circuit (PMIC).

As such, after the battery connector is reconnected with the main board, if the PMIC-power-on identifier exists in the power-off state bit information, the disconnection between the battery connector and the main board can be determined to be the after-sales disconnection; if there is no PMIC-power-on identifier in the power-off state bit information, the disconnection between the battery connector and the main board can be determined to be the unauthorized disconnection.

At S3, determine that a battery of the terminal device has safety hazard, if the disconnection between the battery connector and the main board is determined to be the unauthorized disconnection. Optionally, the terminal device may be further controlled to send reminder information indicative of battery abnormality, if the battery is determined to have safety hazard.

Specifically, since the user of the terminal device or the unauthorized entity may disassemble or assemble the terminal device in a non-standard manner, the unauthorized disconnection will usually lead to battery damage, such as making the battery subject to an external impact which is beyond an extent to which the battery is able to bear, poor contact which occurs when the battery connector and the main board are reconnected, etc., thereby resulting in battery safety hazard, for example, a whole machine failure of the terminal device, or even bursting into fire and explosion. Therefore, when the disconnection between the battery connector and the main board is the unauthorized disconnection, the battery of the terminal device can be determined to have safety hazard, and the terminal device can be controlled to send reminder information indicative of battery abnormality in order for the user to take corresponding preventive measures, for example, remind the user to power off the terminal device as soon as possible, or remind the user to get the terminal device repaired at the authorized entity as soon as possible.

On the contrary, since the authorized entity can disassemble or assemble the mobile phone in a relatively standard manner, the after-sales disconnection will generally not cause battery safety hazard. Therefore, when the disconnection between the battery connector and the main board is the after-sales disconnection, the terminal device can be determined to be in a battery-safety state (that is, a state where the battery can be safely used), and the terminal device can be controlled to send reminder information indicative of battery safety, whereby the user can use the terminal device freely.

In an example, the terminal device is powered by the battery after the battery connector is reconnected with the main board and the terminal device is turned on, and the reminder information indicative of battery safety or the reminder information indicative of battery abnormality is displayed on a display screen of the terminal device, or the reminder information indicative of battery safety or the reminder information indicative of battery abnormality can be announced by an audio device of the terminal device in order for the user to be promptly informed of battery state after disassembly or assembly.

In another example, upon disconnection between the battery connector and the main board, the terminal device is powered by an energy storage device including a capacitor, and the reminder information indicative of battery safety or the reminder information indicative of battery abnormality is displayed on a display screen of the terminal device, or the reminder information indicative of battery safety or the reminder information indicative of battery abnormality can be announced by an audio device of the terminal device in order for the user to be promptly informed of battery state after disassembly or assembly.

In addition, in an implementation, corresponding functions of the terminal device are restricted, upon determining that the battery of the terminal device has safety hazard.

For example, a quick charging function of the terminal device is restricted with only a normal charging manner allowed for charging the battery, or the battery is directly forbidden to be charged by the terminal device in any charging manner to prevent the battery with safety hazard from falling at risk due to charging. Applications of high power consumption can also be forbidden to be launched and run to prevent the battery with safety hazard from falling at risk due to quick discharging.

In another implementation, the terminal device is controlled to send identity information of the terminal device to an after-sales management system upon determining that the battery of the terminal device has safety hazard, whereby the after-sales management system monitors the terminal device.

For example, international mobile subscriber identification (IMSI) number, international mobile equipment identification (IMEI) number, a serial number (SN), or mobile equipment identification (MEID) which can be used to recognize the terminal device can be sent to the after-sales management system. As such, when the terminal device is sent for detection and repair, the terminal device can be recognized by the after-sales management system according to the above identity information, such that the battery of the terminal device can be detected and maintained mainly in safety performance.

Figure 5:
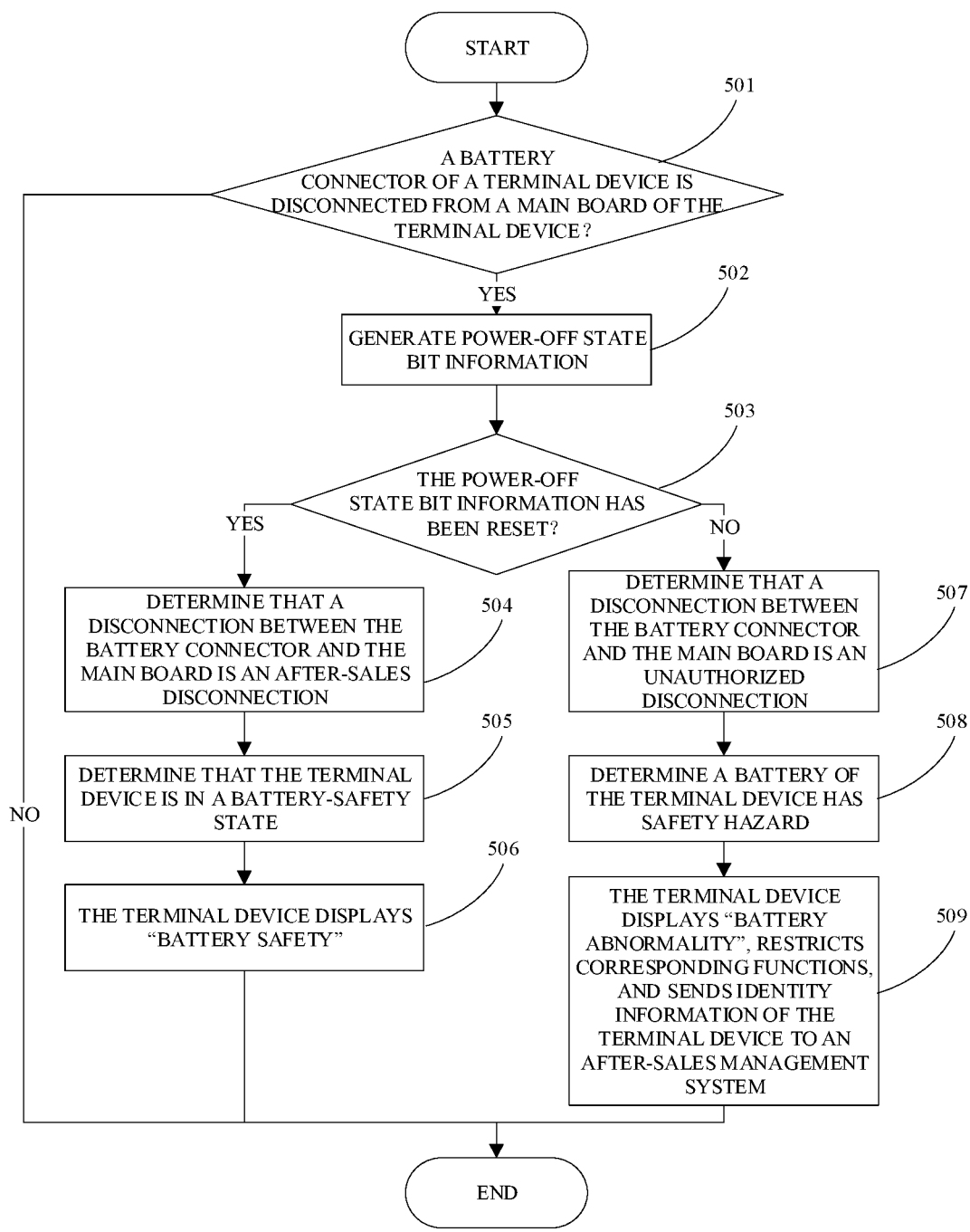
FIG. 5 is a flowchart of a method for monitoring battery safety in a terminal device according to an implementation of the present disclosure.
Figure 6:
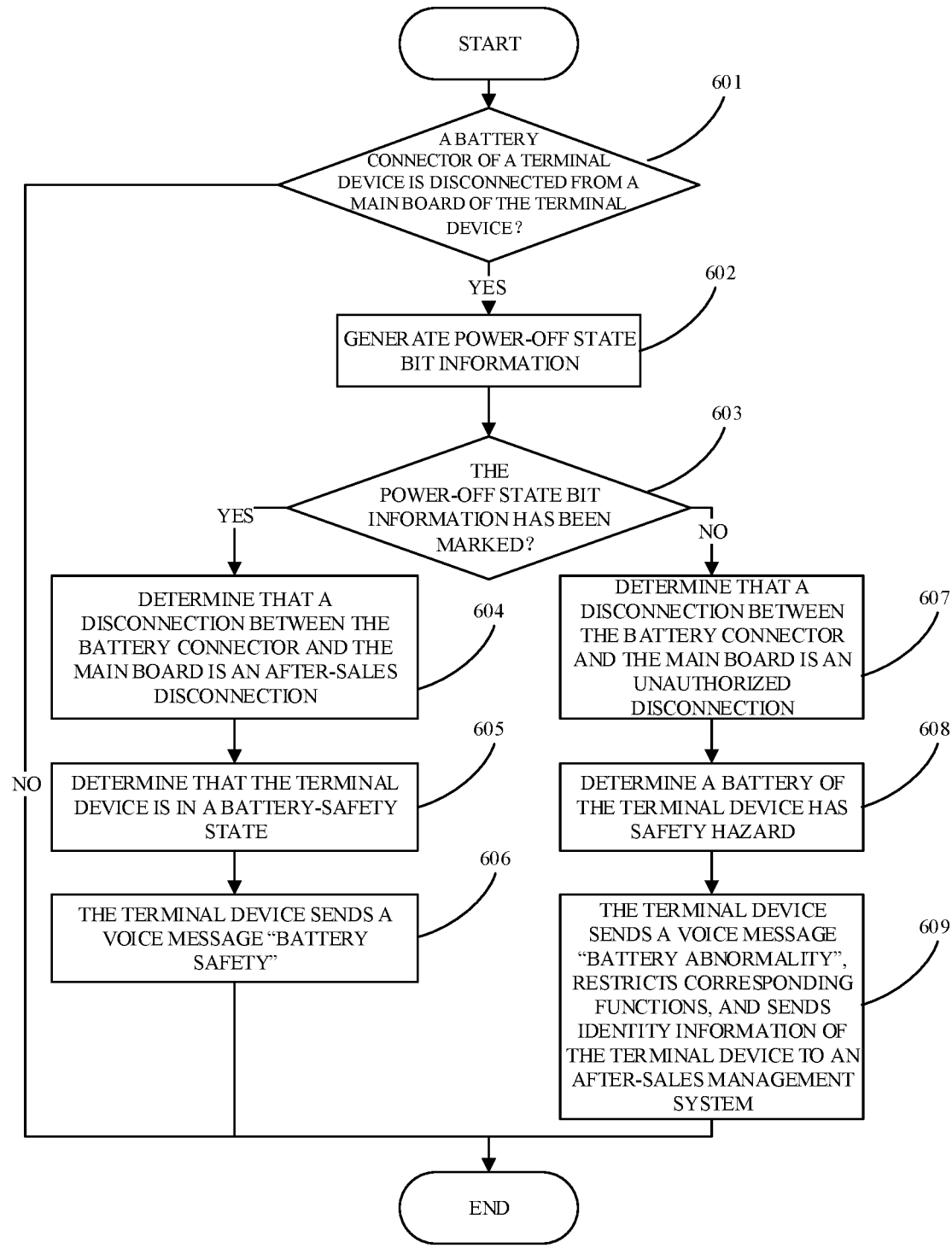
FIG. 6 is a flowchart of a method for monitoring battery safety in a terminal device according to another implementation of the present disclosure.

The following will describe the method for monitoring battery safety in a terminal device provided herein in connection with two specific implementations illustrated in FIG. 5 and FIG. 6.

In one implementation, the power-off state information is reset information. As illustrated in FIG. 5, the method begins at block 501.

At 501, whether a battery connector of the terminal device is disconnected from a main board of the terminal device is detected. If yes, proceed to 502. Otherwise, the present procedure ends.

At 502, power-off state bit information is generated.

At 503, whether the power-off state bit information has been reset is determined. If yes, proceed to 504. Otherwise, proceed to 507.

At 504, determine that a disconnection between the battery connector and the main board is an after-sales disconnection.

At 505, determine that the terminal device is in a battery-safety state.

At 506, the terminal device displays "battery safety".

At 507, determine that a disconnection between the battery connector and the main board is an unauthorized disconnection.

At 508, determine a battery of the terminal device has safety hazard.

At 509, the terminal device displays "battery abnormality", restricts corresponding functions, and sends identity information of the terminal device to an after-sales management system.

In another implementation, the power-off state information is mark information. As illustrated in FIG. 6, the method begins at block 601.

At 601, whether a battery connector of the terminal device is disconnected from a main board of the terminal device is detected. If yes, proceed to 602. Otherwise, the present procedure ends.

At 602, power-off state bit information is generated.

At 603, whether the power-off state bit information has been marked is determined. If yes, proceed to 604. Otherwise, proceed to 607.

At 604, determine that a disconnection between the battery connector and the main board is an after-sales disconnection.

At 605, determine that the terminal device is in a battery-safety state.

At 606, the terminal device sends a voice message "battery safety".

At 607, determine that a disconnection between the battery connector and the main board is an unauthorized disconnection.

At 608, determine a battery of the terminal device has safety hazard.

At 609, the terminal device sends a voice message "battery abnormality", restricts corresponding functions, and sends identity information of the terminal device to an after-sales management system.

To summarize, according to the method for monitoring battery safety in a terminal device provided herein, the power-off information generated upon the disconnection between the battery connector and the main board is acquired. Whether the disconnection between the battery connector and the main board is the unauthorized disconnection is determined according to the power-off information. The battery of the terminal device is determined to have safety hazard and/or the terminal device is controlled to send the reminder information indicative of battery abnormality, upon determining that the disconnection between the battery connector and the main board is the unauthorized disconnection. As such, safety hazard due to an unauthorized disassembly of the battery can be effectively avoided, which makes the terminal device safer.

Corresponding to the method for monitoring battery safety in a terminal device provided in the above implementations, a computer readable storage medium is further provided.

Figure 7:
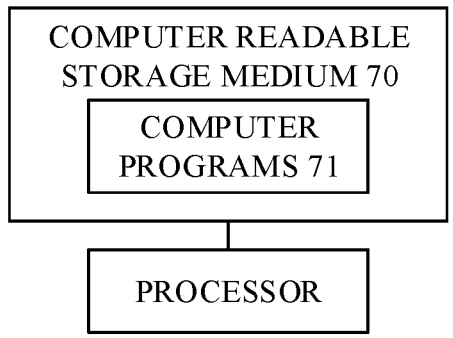
FIG. 7 is a schematic block diagram of a computer readable storage medium according to an implementation of the present disclosure.

FIG. 7 is a schematic block diagram of a computer readable storage medium according to an implementation of the present disclosure.

As illustrated in FIG. 7, the computer readable storage medium 70 is configured to store computer programs 71 which, when executed by a processor, are operable with the processor to perform the method for monitoring battery safety in a terminal device provided in the above implementations.

With aid of the computer readable storage medium provided in implementations of the disclosure, by executing the computer programs stored in the computer readable storage medium, safety hazard due to an unauthorized disassembly of the battery can be effectively avoided, which is possible to improve greatly safety of the terminal device.

In addition, implementations of the disclosure further provide a system for monitoring battery safety in a terminal device.

Figure 8:
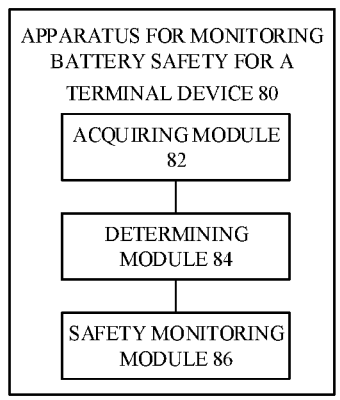
FIG. 8 is a schematic block diagram of a system for monitoring battery safety in a terminal device according to an implementation of the present disclosure.

FIG. 8 is a schematic block diagram of a system for monitoring battery safety in a terminal device according to an implementation of the present disclosure.

As illustrated in FIG. 8, the system 80 for monitoring battery safety in a terminal device includes an acquiring module 82, a determining module 84, and a safety monitoring module 86. The acquiring module 82 is configured to acquire power-off information generated upon disconnection between a battery connector of the terminal device and a main board of the terminal device. The determining module 20 is configured to determine, according to the power-off information, whether the disconnection between the battery connector and the main board is an unauthorized disconnection. The safety monitoring module 86 is configured to determine that a battery of the terminal device has safety hazard and control the terminal device to send reminder information indicative of battery abnormality, when the disconnection between the battery connector and the main board is the unauthorized disconnection.

Figure 9:
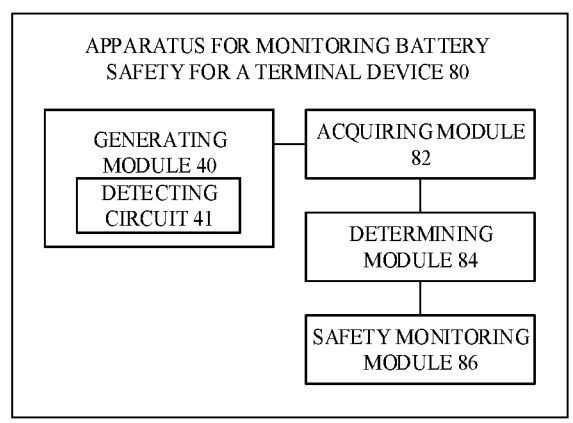
FIG. 9 is a schematic block diagram of a system for monitoring battery safety in a terminal device according to another implementation of the present disclosure.

In another implementation, as illustrated in FIG. 9, the system 80 further includes a generating module 40. The generating module 40 includes a detecting circuit 41 for detecting whether the battery connector is disconnected from the main board. Specifically, when the detecting circuit 41 detects that the battery connector is disconnected from the main board, the generating module 40 generates power-off state bit information and uses the power-off state bit information as the power-off information.

In one implementation, the battery connector is a BTB connector.

In an example, the BTB connector can include a metal pressing board, and the detecting circuit 41 can be coupled with the metal pressing board. In this way, when the metal pressing board is taken out or disconnected, the detecting circuit 41 is changed from a short-circuit state to an open-circuit state. As such, when the detecting circuit 41 is changed to the open-circuit state, determine that the metal pressing board has been taken out or disconnected, thereby further determining that the battery connector is disconnected from the main board.

For example, as illustrated in FIG. 2, FIG. 3, and FIG. 4, the terminal device such as a mobile phone can include a metal housing. The metal housing, that is, the metal pressing board of the BTB connector, can be connected and fixed with a body of the terminal device through adhesion, welding, etc. In general, since the battery is a built-in battery of the terminal device, the metal housing will not be removed unless the battery is disassembled. Therefore, the detecting circuit 41 can also be coupled with the metal housing, and the detecting circuit 41 will change from the short-circuit state to the open-circuit state when the metal housing is removed. In this way, it is possible to determine that the metal housing is removed when the detecting circuit changes into the open-circuit state, and further determine that the battery connector is disconnected from the main board.

In another example, the detecting circuit 41 and a management chip or a control chip of the battery can transmit signals to each other and receive signals from each other periodically through the BTB connector. When the detecting circuit 41 detects that transmission and reception of such periodic signals have stopped, determine that the battery connector is disconnected from the main board.

In addition, the generating module 40 generates the power-off state bit information when the detecting circuit detects that the battery connector is disconnected from the main board, and uses the power-off state bit information as the power-off information.

In this implementation, the disconnection between the battery connector and the main board may be an after-sales disconnection, for example, an authorized entity disassembles the battery during a professional repair or detection, or may be the unauthorized disconnection, for example, a user of the terminal device or an unauthorized entity disassembles the battery privately.

When the authorized entity disassembles the battery, such disassembly behavior can be marked as normal through some operations, such as resetting or marking the power-off state bit information.

In an implementation, take resetting the power-off state bit information as an example. In terms of determining, according to the power-off information, whether the disconnection between the battery connector and the main board is the unauthorized disconnection, the determining module 20 is configured to: determine whether the power-off state bit information has been reset; determine that the disconnection between the battery connector and the main board is an after-sales disconnection upon determining that the power-off state bit information has been reset; determine that the disconnection between the battery connector and the main board is the unauthorized disconnection upon determining that the power-off state bit information has not been reset.

For instance, power-off state bit will be set to 1 when the battery connector is disconnected from the main board. When the authorized entity disassembles the battery, a resetting instruction can be written into programs run in the CPU to restore the power-off state bit set from 1 to 0. Alternatively, the power-off state bit information can be reset through an RTC.

As such, after the battery connector is reconnected with the main board, if the power-off state bit remains 1, the determining module 20 determines that the disconnection between the battery connector and the main board is the unauthorized disconnection. If the power-off state bit is 0, the determining module 84 determines that the disconnection between the battery connector and the main board is the after-sales disconnection.

In another implementation, take marking the power-off state bit information as an example. In terms of determining, according to the power-off information, whether the disconnection between the battery connector and the main board is the unauthorized disconnection, the determining module 84 is configured to: determine whether the power-off state bit information has been marked; determine that the disconnection between the battery connector and the main board is an after-sales disconnection upon determining that the power-off state bit information has been marked; determine that the disconnection between the battery connector and the main board is the unauthorized disconnection upon determining that the power-off state bit information has not been not marked.

For example, the power-off state bit information can be marked through a power-on-again identifier.

As such, after the battery connector is reconnected with the main board, if the PMIC-power-on identifier exists in the power-off state bit information, the determining module 84 can determine that the disconnection between the battery connector and the main board is the after-sales disconnection; if there is no PMIC-power-on identifier in the power-off state bit information, the determining module 84 can determine that the disconnection between the battery connector and the main board is the unauthorized disconnection.

In addition, in an implementation, the safety monitoring module 86 is further configured to determine that the terminal device is in a battery-safety state when the disconnection between the battery connector and the main board is the after-sales disconnection and configured to control the terminal device to send reminder information indicative of battery safety upon determining that the terminal device is in the battery-safety state, in order for the user to use the terminal device freely.

It is to be noted that, since the authorized entity can disassemble or assemble the mobile phone in a relatively standard manner, the after-sales disconnection will generally not cause battery safety hazard.

In another implementation, the safety monitoring module 86 is configured to determine that the battery of the terminal device has safety hazard when the disconnection between the battery connector and the main board is the unauthorized disconnection and configured to control the terminal device to send reminder information indicative of battery abnormality upon determining that the battery of the terminal device has safety hazard, in order for the user to take corresponding preventive measures. For example, the safety monitoring module 86 can remind the user to power off the terminal device as soon as possible, or remind the user to get the terminal device repaired at the authorized entity as soon as possible.

It is to be noted that, since the user of the terminal device or the unauthorized entity may disassemble or assemble the terminal device in a non-standard manner, the unauthorized disconnection will usually lead to battery damage, such as making the battery subject to an external impact which is beyond an extent to which the battery is able to bear, poor contact which occurs when the battery connector and the main board are reconnected, etc., thereby resulting in battery safety hazard, for example, a whole machine failure of the terminal device, or even bursting into fire and explosion.

In an example, the terminal device is powered by the battery after the battery connector is reconnected with the main board and the terminal device is turned on, and the reminder information indicative of battery safety or the reminder information indicative of battery abnormality is displayed on a display screen of the terminal device, or the reminder information indicative of battery safety or the reminder information indicative of battery abnormality can be announced by an audio device of the terminal device.

In another example, upon disconnection between the battery connector and the main board, the terminal device is powered by an energy storage device including a capacitor, and the reminder information indicative of battery safety or the reminder information indicative of battery abnormality is displayed on a display screen of the terminal device, or the reminder information indicative of battery safety or the reminder information indicative of battery abnormality can be announced by an audio device of the terminal device.

In addition, in an implementation, the safety monitoring module 86 is further configured to restrict corresponding functions of the terminal device, upon determining that the battery of the terminal device has safety hazard.

For example, a quick charging function of the terminal device is restricted with only a normal charging manner allowed for charging the battery, or the battery is directly forbidden to be charged by the terminal device in any charging manner to prevent the battery with safety hazard from falling at risk due to charging. Applications of high power consumption can also be forbidden to be launched and run to prevent the battery with safety hazard from falling at risk due to quick discharging.

In another implementation, the safety monitoring module 86 is further configured to control the terminal device to send identity information of the terminal device to an after-sales management system upon determining that the battery of the terminal device has safety hazard, whereby the after-sales management system monitors the terminal device.

For example, an IMSI number, an IMEI number, an SN, or an MEID which can be used to recognize the terminal device can be sent to the after-sales management system. As such, when the terminal device is sent for detection and repair and the terminal device is recognized by the after-sales management system according to the above identity information, the battery of the terminal device can be detected and maintained mainly in safety performance.

With aid of the system for monitoring battery safety in a terminal device provided herein, the acquiring module acquires the power-off information generated upon the disconnection between the battery connector and the main board. The determining module determines, according to the power-off information, whether the disconnection between the battery connector and the main board is the unauthorized disconnection. The safety monitoring module determines that the battery of the terminal device has safety hazard and controls the terminal device to send the reminder information indicative of battery abnormality, when the disconnection between the battery connector and the main board is the unauthorized disconnection. In this way, safety hazard due to an unauthorized disassembly of the battery can be effectively avoided, which makes the terminal device safer.

Figure 10:
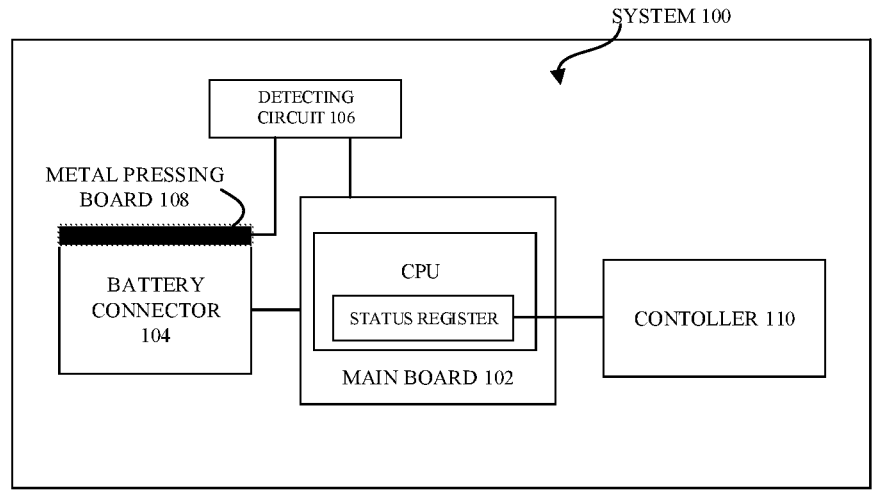
FIG. 10 is a schematic block diagram of a system for monitoring battery safety in a terminal device according to another implementation of the disclosure.

FIG. 10 is a schematic block diagram of a system for monitoring battery safety in a terminal device according to another implementation of the disclosure.

As illustrated in FIG. 10, the system 100 includes a main board 102, a battery connector 104, a detecting circuit 106, and a controller 110. The main board 102 includes a CPU. The battery connector 104 is configured to be connected with the main board 102. The detecting circuit 106 is configured to detect a status of connection between the main board 102 and the battery connector 104, where the CPU is configured to generate power-off information when the detecting circuit 106 detects that the connection between the main board 102 and the battery connector 104 is disconnected. The controller 110 is configured to determine whether a battery has safety hazard according to the power-off information generated by the CPU.

In an implementation, as illustrated in FIG. 10, the battery connector 104 is a board-to-board (BTB) connector. The battery connector 104 includes a metal pressing board 108. Alternatively, the battery connector 104 is coupled with the metal pressing board 108. For example, the metal pressing board 108 is the housing of the mobile terminal.

Figure 11:
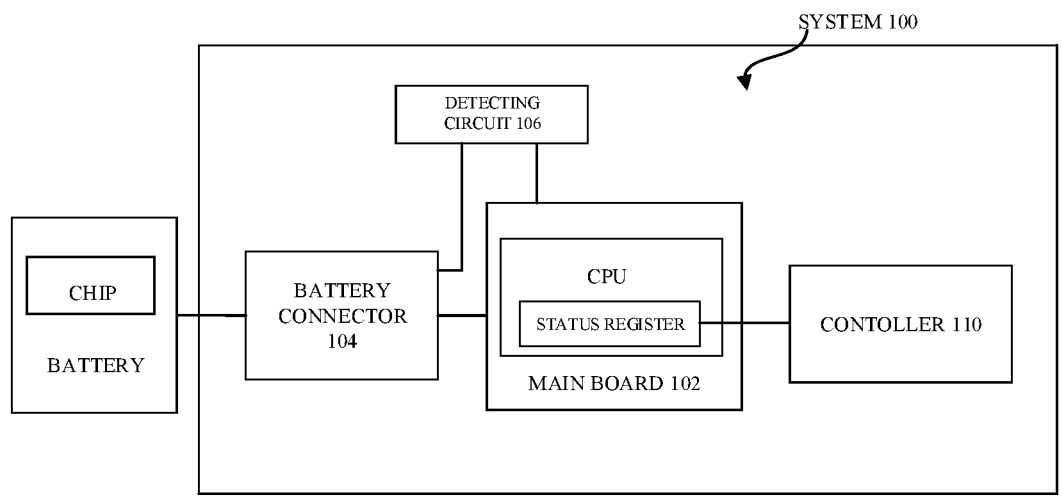
FIG. 11 is a schematic block diagram of a system for monitoring battery safety in a terminal device according to another implementation of the disclosure.

In an implementation, as illustrated in FIG. 11, the detecting circuit 106 is configured to periodically communicate with a control chip inside the battery via the battery connector 104, for example, periodically transmit/receive signals to/from the control chip. The detecting circuit 106 is configured to determine that the connection between the main board 102 and the battery connector 104 is disconnected when signal transmission or reception between the detecting circuit 106 and the control chip fails.

In an implementation, as illustrated in FIG. 10 or FIG. 11, the CPU comprises a status register, the status register is configured to generate power-off state bit information as the power-off information.

In an implementation, the controller 110 is configured to determine that the battery has safety hazard when the power-off information has been reset or has been marked.

Corresponding to the system for monitoring battery safety in a terminal device provided in the above implementations, a terminal device is further provided. The terminal device can include the system 100 of FIG. 10 or FIG. 11.

Figure 12:
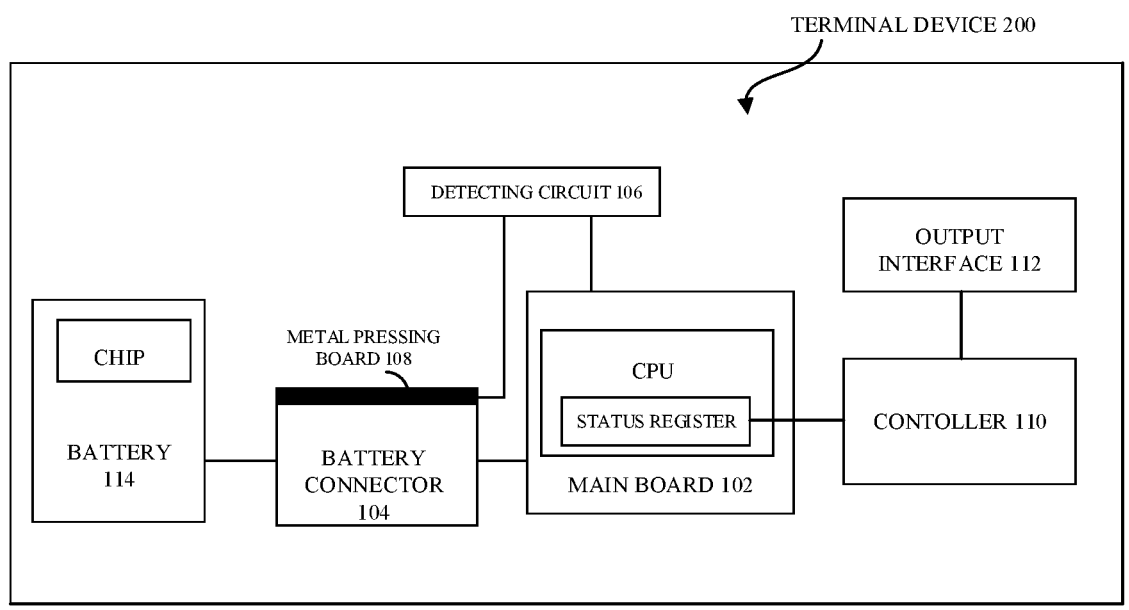
FIG. 12 is a schematic block diagram of a terminal device according to an implementation of the present disclosure.

FIG. 12 is a schematic block diagram of a terminal device according to an implementation of the present disclosure.

As illustrated in FIG. 12, the terminal device 200 includes a main board 102, a battery connector 104, a detecting circuit 106, a controller 110, and a battery 114. The battery 114 is configured to be connected with the main board 102 via the battery connector 104. The detecting circuit 106 is configured to detect a status of connection between the main board 102 and the battery connector 104, where the main board 102 is configured to generate power-off information when the detecting circuit 106 detects that the connection between the main board 102 and the battery connector 104 is disconnected. The controller 110 is configured to determine whether the battery 114 has safety hazard according to the power-off information generated by the main board 102.

The terminal device 200 may further include the metal pressing board 108 and/or the chip of the battery.

When the metal pressing board is employed, it can be structured as part of the battery connector 104 or can be structured as a separate component such as the housing of the terminal device. The detecting circuit 106 can determine the connection between the battery connector 104 and the main board 102 according to the status of the metal pressing board. Specifically, when the metal pressing board is in a normal installation status, the detecting circuit is in a short-circuit state and no current flows through the detecting circuit, on the other hand, when the metal pressing board is removed, the detecting circuit is in an open-circuit state. As such, when the metal pressing board 108 is removed, the detecting circuit changes to the open-circuit state from the short-circuit state and can determine that the battery connector is disconnected from the main board.

Additionally or alternatively to the metal pressing board, with the chip of the battery, the detecting circuit can determine the connection between the battery connector and the main board by communicating with the chip via the battery connector. When such communication fails, the detecting circuit can determine that the battery connector is disconnected from the main board.

In an implementation, the controller 110 is configured to determine that the battery has safety hazard when the power-off information has been reset or has been marked, as described above in implementations of the method for monitoring battery safety.

In an implementation, the terminal device further includes an output interface 112, which is coupled with the controller 110 and configured to output reminder information indicative of battery abnormality when the controller 110 determines that the battery has safety hazard. For example, the output interface 112 can be a display screen or a speaker, and accordingly, the information can be in the form of text, video, audio, and the like.

For features which be applied to both of the methods as well as the system and methods, details not given in the system and terminal device to avoid redundancy, and reference can be made to the foregoing method implementations.

With aid of the terminal device provided, safety hazard due to an unauthorized disassembly of the battery can be effectively avoided, which is possible to improve greatly safety of the terminal device.

It should be understood that terms such as "center", "longitudinal", "lateral", "length", "width", "thickness", "on", "under", "front", "back", "left", "right", "vertical", "horizontal", "top", "bottom", "in", "out", "clockwise", "anticlockwise", "axial", "radial", "circumferential", and the like referred to herein which indicate directional relationship or positional relationship are directional relationship or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure.

In addition, terms "first", "second", and the like are only used for description and cannot be understood as explicitly or implicitly indicating relative importance or implicitly indicating the number of technical features referred to herein. Therefore, features restricted by terms "first", "second", and the like can explicitly or implicitly include at least one of the features. In the context of the disclosure, unless stated otherwise, "multiple" refers to "at least two", such as two, three, and the like.

Unless stated otherwise, in the disclosure, terms "installing", "coupling", "connecting", "fixing", and the like referred to herein should be understood in broader sense. For example, coupling may be a fixed coupling, a removable coupling, or an integrated coupling, may be a mechanical coupling, an electrical coupling, and may be a direct coupling, an indirect coupling through a medium, or a communication coupling between two components or an interaction coupling between two components, unless stated otherwise. For those of ordinary skill in the art, the above terms in the present disclosure can be understood according to specific situations.

Unless stated otherwise, in the disclosure, a first feature being "on" or "under" a second feature referred to herein can refer to a direct contact between the first feature and the second feature or an indirect contact between the first feature and the second feature via a medium. In addition, the first feature being "above", "over", and "on" the second feature can be the first feature being right above or obliquely above the second feature or only refers to the first feature being at a higher horizontal level than the second feature. The first feature being "below", "underneath", and "under" the second feature can be the first feature being right below or obliquely below the second feature or only refers to the first feature being at a lower horizontal level than the second feature.

The reference term "an embodiment", "some embodiments", "implementation", "specific implementation", or "some implementations" referred to herein means that a particular feature, structure, material, or characteristic described in conjunction with the embodiment or implementation may be contained in at least one embodiment or implementation of the present disclosure. The phrase appearing in various places in the specification does not necessarily refer to the same embodiment or implementation. The particular feature, structure, material, or characteristic described may be properly combined in any one or more embodiments or implementations. In addition, when the embodiment or implementation is not mutually exclusive with other embodiments or implementations, it is expressly and implicitly understood by those skilled in the art that an embodiment described herein may be combined with other embodiments or implementations.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Additionally, various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a read-only memory (ROM), a random access memory (RAM), a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for monitoring battery safety in a terminal device, performed by a system for monitoring battery safety in the terminal device, the system for monitoring battery safety comprising:
    a main board comprising a CPU;
    a battery connector configured to be connected with the main board;
    a detecting circuit configured to detect a status of connection between the main board and the battery connector, wherein the CPU is configured to generate power-off information when the detecting circuit detects that the connection between the main board and the battery connector is disconnected; and
    a controller configured to determine whether the battery has safety hazard according to the power-off information;
    the CPU comprising a status register, and the status register being configured to generate power-off state bit information as the power-off information;
    the method comprising:
        acquiring power-off information generated upon disconnection between a battery connector of the terminal device and a main board of the terminal device;
        determining, according to the power-off information, whether the disconnection between the battery connector and the main board is an unauthorized disconnection; and
        determining that a battery of the terminal device has safety hazard and controlling the terminal device to send reminder information indicative of battery abnormality, upon determining that the disconnection between the battery connector and the main board is the unauthorized disconnection.

2. The method of claim 1, wherein power-off state bit information is generated upon the disconnection between the battery connector and the main board and is used as the power-off information.

3. The method of claim 2, wherein determining, according to the power-off information, whether the disconnection between the battery connector and the main board is the unauthorized disconnection comprises:
    determining whether the power-off state bit information has been reset; and
    determining that the disconnection between the battery connector and the main board is the unauthorized disconnection upon determining that the power-off state bit information has not been reset.

4. The method of claim 3, further comprising:
    determining that the disconnection between the battery connector and the main board is an after-sales disconnection upon determining that the power-off state bit information has been reset.

5. The method of claim 2, wherein determining, according to the power-off information, whether the disconnection between the battery connector and the main board is the unauthorized disconnection comprises:
    determining whether the power-off state bit information has been marked; and
    determining that the disconnection between the battery connector and the main board is the unauthorized disconnection upon determining that the power-off state bit information has not been marked.

6. The method of claim 5, further comprising:
    determining that the disconnection between the battery connector and the main board is an after-sales disconnection upon determining that the power-off state bit information has been marked.

7. The method of claim 1, further comprising:
    determining that the terminal device is in a battery-safety state and controlling the terminal device to send reminder information indicative of battery safety, upon determining that the disconnection between the battery connector and the main board is not the unauthorized disconnection.

8. The method of claim 1, further comprising:
    restricting corresponding functions of the terminal device, upon determining that the disconnection between the battery connector and the main board is the unauthorized disconnection.

9. The method of claim 8, wherein the corresponding functions comprise at least one of: quick charging of the battery, charging of the battery, and launching of an application of high power consumption.

10. The method of claim 1, further comprising:
    controlling the terminal device to send identity information of the terminal device to an after-sales management system upon determining that the disconnection between the battery connector and the main board is the unauthorized disconnection, wherein the identity information is used for the after-sales management system to monitor the terminal device.

11. A system for monitoring battery safety in a terminal device, comprising:
- a main board comprising a CPU;
- a battery connector configured to be connected with the main board;
- a detecting circuit configured to detect a status of connection between the main board and the battery connector, wherein the CPU is configured to generate power-off information when the detecting circuit detects that the connection between the main board and the battery connector is disconnected; and
- a controller configured to determine whether the battery has safety hazard according to the power-off information;
- wherein the CPU comprises a status register, the status register is configured to generate power-off state bit information as the power-off information.

12. The system of claim 11, wherein the battery connector is a board-to-board connector.

13. The system of claim 12, wherein the battery connector is configured to be coupled with a metal pressing board.

14. The system of claim 13, wherein the detecting circuit is coupled with the metal pressing board such that the detecting circuit is in a short-circuit state when the battery connector is coupled with the metal pressing board and in an open-circuit state when the metal pressing board is removed.

15. The system of claim 11, wherein the detecting circuit is configured to periodically transmit/receive signals to/from a control chip inside the battery via the battery connector, and configured to determine that the connection between the main board and the battery connector is disconnected when signal transmission or reception between the detecting circuit and the control chip fails.

16. The system of claim 11, wherein the controller is configured to determine the battery has safety hazard when the power-off information has been reset or has been marked.

17. A terminal device, comprising:
- a battery connector;
- a main board;
- a battery configured to be connected with the main board via the battery connector;
- a detecting circuit configured to detect a status of connection between the main board and the battery connector, wherein the main board is configured to generate power-off information when the detecting circuit detects that the connection between the main board and the battery connector is disconnected; and
- a controller configured to determine whether the battery has safety hazard according to the power-off information;
- wherein the main board comprises a status register, the status register is configured to generate power-off state bit information as the power-off information.

18. The terminal device of claim 17, wherein the controller is configured to determine the battery has safety hazard when the power-off information has been reset or has been marked.

19. The terminal device of claim 17, further comprising:
- an output interface coupled with the controller and configured to output reminder information indicative of battery abnormality when the controller determines that the battery has safety hazard.

* * * * *